E. H. OVERSMITH.
MOTOR VEHICLE.
APPLICATION FILED OCT. 21, 1918.
1,350,668.
Patented Aug. 24, 1920.
2 SHEETS—SHEET 1.
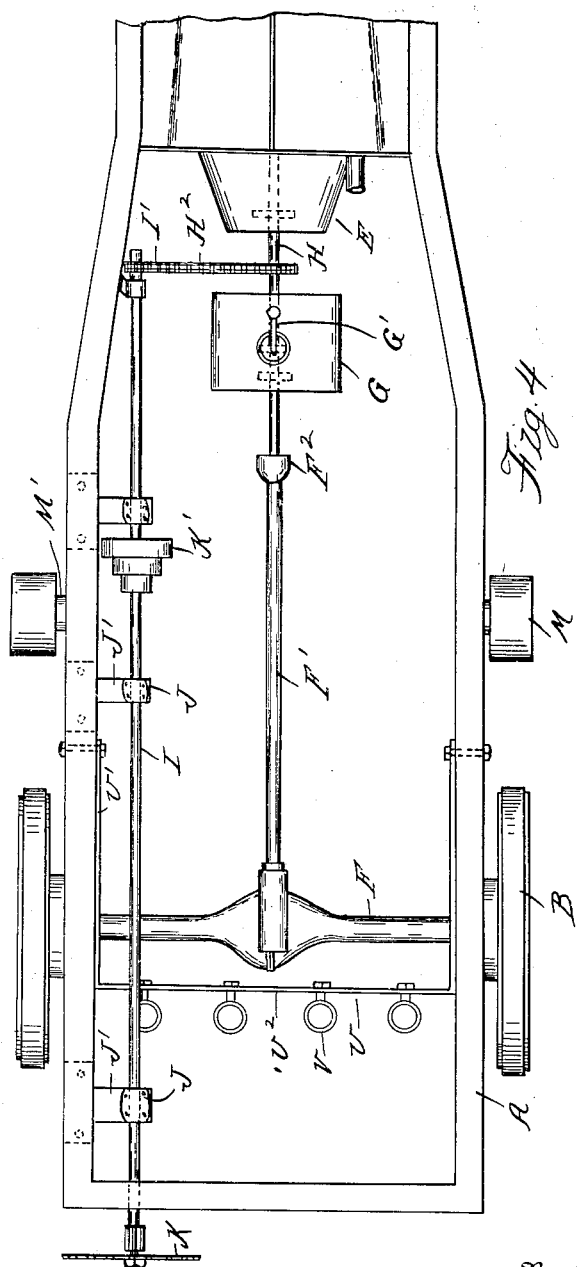
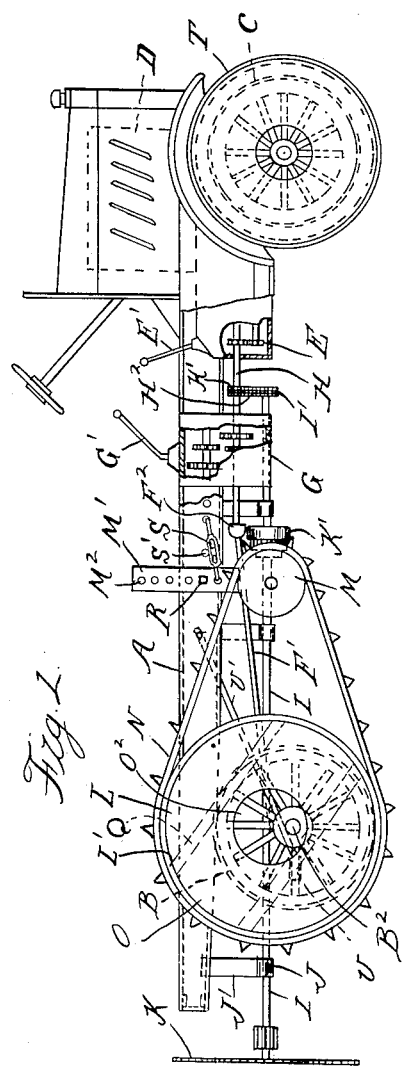
Inventor
Elmer H. Oversmith E. H. OVERSMITH.
MOTOR VEHICLE.
APPLICATION FILED OCT. 21, 1918.
1,350,668.
Patented Aug. 24, 1920.
2 SHEETS—SHEET 2.
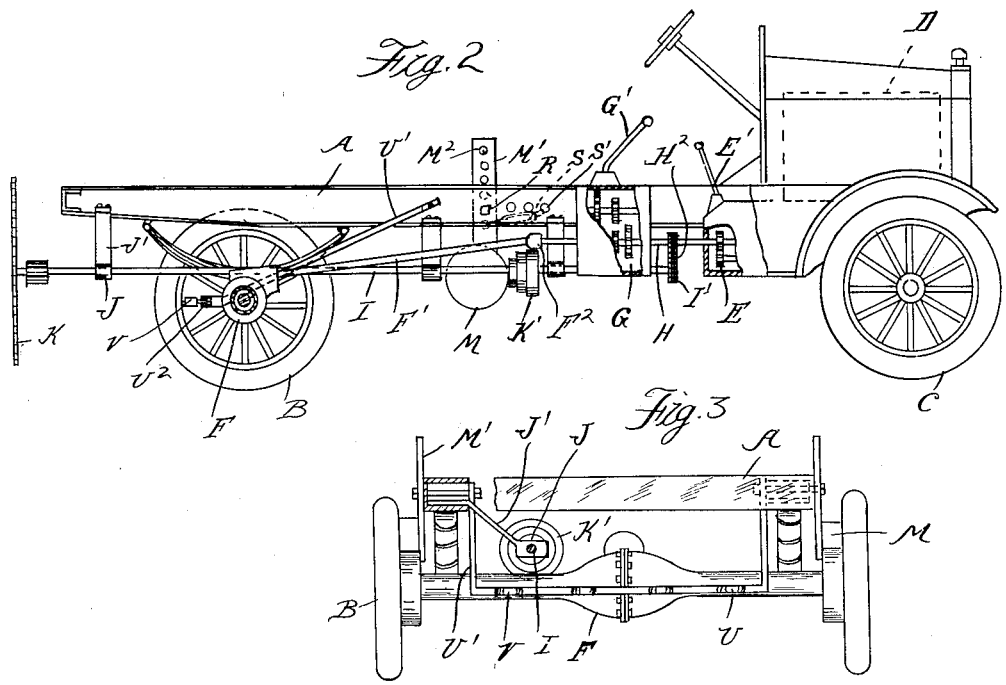
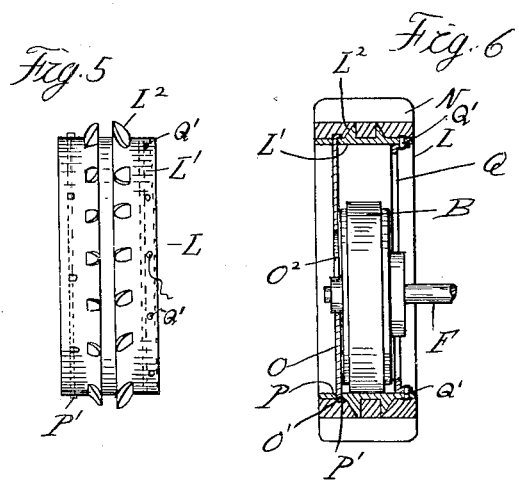
Inventor
Elmer H. Oversmith
By Whittemore, Hulbert & Whittemore
Attorneys

UNITED STATES PATENT OFFICE.

ELMER H. OVERSMITH, OF BUFFALO, NEW YORK, ASSIGNOR TO THE BUFFALO TRUCK AND TRACTOR CORPORATION, OF BUFFALO, NEW YORK, A CORPORATION OF NEW YORK.

MOTOR-VEHICLE.

1,350,668.   Specification of Letters Patent.   Patented Aug. 24, 1920.

Application filed October 21, 1918. Serial No. 258,952.

*To all whom it may concern:*

Be it known that I, ELMER H. OVERSMITH, a citizen of the United States of America, residing at Buffalo, in the county of Erie and State of New York, have invented certain new and useful Improvements in Motor-Vehicles, of which the following is a specification, reference being had therein to the accompanying drawings.

The invention relates to motor vehicles and has for its object the provision of a construction, which can be used alternatively as a truck, power plant or tractor. Another object of the invention is to provide a track construction readily attachable to the truck drive wheels, and further to provide an auxiliary transmission gearing for reducing the speed of the vehicle when used as a tractor and correspondingly increasing the power, and also for disconnecting the drive wheels from the engine when using the engine as a separate power plant. Further objects of the invention reside in the novel arrangements and combinations of parts as more fully hereinafter set forth.

In the drawings:

Figure 1 is a side elevation of the motor vehicle with parts broken away, when used as a tractor;

Fig. 2 is a side elevation of the motor vehicle with parts broken away, when used as a truck;

Fig. 3 is a rear end view of the construction shown in Fig. 1;

Fig. 4 is a top plan view of a portion thereof;

Fig. 5 is an end elevation of the creeper wheel;

Fig. 6 is a cross-section therethrough with the truck drive wheel therewithin.

A is the frame of the motor vehicle mounted upon the drive wheels B and the steering wheels C. D is the engine, E the transmission gearing driven thereby, E' the control lever for the gearing, F the rear axle, and F' the propeller shaft for driving the rear axle and from the transmission gearing E. As thus far described, the construction is of the usual type.

G is an auxiliary transmission gearing to the rear of the transmission gearing E and connected thereto by the shaft H. The transmission gearing G is also connected to the propeller shaft F' through the universal joint F². The control lever G' controls the engagement of the gears in the transmission gearing G, the arrangement being such that the propeller shaft F' can be disconnected from the shaft H, rotated at the same speed as the shaft or rotated at a reduced speed, for purposes more fully hereinafter described.

I is a power shaft extending longitudinally of the frame A, located between the frame and rear axle, and mounted in suitable bearings J upon the brackets J', which are secured to the frame. The power shaft extends beyond the rear of the frame and is adapted to receive suitable power-driven devices, such as the rotary saw K. When not in use, a suitable protective cap (not shown) may be placed over the end of the power shaft. Intermediate the ends of the power shaft I is mounted the step pulley K' for driving at different speeds suitable external power-driven devices. The power shaft I is suitably driven from the shaft H as by the sprocket wheel I' upon the power shaft, the sprocket wheel H' upon the shaft H and the chain H².

With the above arrangement the motor vehicle may be used as a truck by suitably connecting the gears in the transmission gearings E and G. The motor vehicle may also be used as a power plant by suitably connecting the gears in the transmission gearing E and disconnecting the gears in the transmission gearing G and connecting the power shaft I to the shaft H by the chain H². When used as a power plant, either the step pulley can be used or the rear end of the power shaft.

In order to change the truck into a tractor, the following track construction is provided: L are creeper wheels inclosing the truck drive wheels B, M creeper idler wheels mounted upon the frame A forward of the creeper wheels L, and N endless creepers or tracks upon their respective creeper wheels L and idler wheels M. The creeper wheel L is readily attachable to its respective drive wheel B and has the tread L' preferably provided with the teeth L². The inner diameter of the tread is of greater diameter than the outer diameter of the wheel B.

For retaining the creeper wheel upon the drive wheel the former has the closure O at its outer side, which is secured to the tread of the creeper wheel by the projections O' extending through the apertures P in the tread and clenched thereover at P'. The creeper wheel also has the bars Q on its inner side, which are suitably secured to the tread L' as by the rivets Q'. The closure O and bars Q are located in from the edges of the tread and are spaced from each other sufficiently to receive the tread B' of the drive wheel with slight clearance to permit of relative rotation of the drive wheel and creeper wheel. The closure O has the central aperture $O^2$ for receiving the hub $B^2$ of the drive wheel.

The idler wheel M is vertically adjustably secured to the frame A by the bar M' upon which the idler wheel is mounted, this bar having the series of apertures $M^2$ therein through one of which the bolt R alternatively extends for connecting the bar to the frame. For taking up the slack in the creeper or track N, the turn-buckle connection S is provided, one end of which is secured to the bar M' near the idler wheel M and the other end of which alternatively engages one of the series of longitudinal apertures S' in the frame A.

From the above description it will be readily seen that the truck may be readily changed to operate as a tractor by attaching the creeper wheels L and the endless creeper or track N, the idler wheels M remaining on the frame at all times if desired. The creeper wheel L may be easily attached to its drive wheel B and the amount of surface of the creeper or track N contacting with the ground is controlled by raising or lowering the idler wheel M through the bar M'. The slack in the creeper or track is easily controlled by the turn-buckle S.

In operating the motor vehicle as a tractor, the control lever G' is shifted to reduce the speed of the propeller shaft F' relative to the shaft H. The traction between the drive wheels B and their creeper wheels L will cause the former to rotate the latter, which will operate the creepers or tracks N over which they move. With this arrangement the truck lays its own track and picks up the same after passing thereover.

The wheels T, of substantially the same construction as the creeper wheels L with the exception that they have no teeth upon their tread, are provided inclosing the steering wheels C for the purpose of increasing their tread so that the tractor may more easily pass over soft ground.

The draw-bar U is provided and comprises the side-bars U' pivotally secured to the frame A forward of the rear axle and the cross-bar $U^2$ connected to the side-bars. The side-bars extend downward and rearward to points in rear alinement with the axle F. The series of couplings V are secured to the cross-bar $U^2$ at spaced points for drawing various implements. With this arrangement of draw-bar the couplings are movable vertically so that they are adapted to be coupled with implements having their draft-bars at varying heights from the ground.

What I claim as my invention is:

1. In a motor vehicle, the combination with the engine and the transmission gearing connected thereto, of a drive wheel, an auxiliary transmission gearing between said drive wheel and first-mentioned transmission gearing, and a second shaft adapted to be driven from said first-mentioned transmission gearing independent of said auxiliary transmission gearing.

2. In a motor vehicle, the combination with the engine and the transmission gearing connected thereto of a propeller shaft, an auxiliary transmission gearing adapted to be connected to said propeller shaft, a shaft between said transmission gearings, and a power shaft adapted to be connected to said last-mentioned shaft.

3. In a motor vehicle, the combination with the engine and the transmission gearing connected thereto, of a propeller shaft an auxiliary transmission gearing between said propeller shaft and engine, a power shaft adapted to be connected to said first-mentioned transmission gearing, extending longitudinally of the vehicle frame and having one end extended outwardly therefrom.

4. In a motor vehicle, the combination with the engine and the transmission gearing connected thereto, of a propeller shaft, an auxiliary transmission gearing between said propeller shaft and first-mentioned transmission gearing, a power shaft adapted to be connected to said first-mentioned transmission gearing and extending longitudinally of the frame of the vehicle, one end of said driven shaft extending beyond said frame, and means upon said power shaft at said end and intermediate its ends for driving external power driven devices.

In testimony whereof I affix my signature.

ELMER H. OVERSMITH.